United States Patent [19]

Sijan et al.

[11] Patent Number: 5,376,443

[45] Date of Patent: Dec. 27, 1994

[54] CONVEYANCE WINDOW WITH SUPPRESSED REFLECTIONS

[75] Inventors: Andrew Sijan, Birmingham; Christopher W. G. Hall, Redditch, both of United Kingdom

[73] Assignee: Pilkington Aerospace Limited, United Kingdom

[21] Appl. No.: 972,632

[22] Filed: Nov. 6, 1992

[30] Foreign Application Priority Data

Nov. 7, 1991 [GB] United Kingdom ............... 9123643

[51] Int. Cl.⁵ ................................. B32B 7/00
[52] U.S. Cl. ................................. 428/332; 89/36.02; 244/121; 244/129.3; 428/349; 428/423.3; 428/425.6; 296/84.1; 296/95.1; 296/96.19
[58] Field of Search ............ 428/349, 423.3, 425.6, 428/332; 528/65, 80; 296/96.19, 95.1, 84.1; 244/129.3, 121; 89/36.02

[56] References Cited

U.S. PATENT DOCUMENTS

| | | | |
|---|---|---|---|
| 4,584,229 | 4/1986 | Bourelier et al. | 428/216 |
| 4,643,944 | 2/1987 | Agethen et al. | 428/349 |
| 4,652,494 | 3/1987 | Bravet et al. | 428/423.1 |
| 4,824,926 | 4/1989 | O'Dwyer et al. | 528/65 |
| 4,925,734 | 5/1990 | Agethen et al. | 428/349 |
| 4,983,461 | 1/1991 | Daude et al. | 428/423.1 |
| 5,116,442 | 5/1992 | Daude et al. | 156/99 |

FOREIGN PATENT DOCUMENTS

| | | |
|---|---|---|
| 0153496 | 9/1985 | European Pat. Off. . |
| 0229326 | 7/1987 | European Pat. Off. . |
| 0304898 | 3/1989 | European Pat. Off. . |
| 2568515 | 2/1986 | France . |

*Primary Examiner*—Paul J. Thibodeau
*Assistant Examiner*—David Abraham
*Attorney, Agent, or Firm*—Burns, Doane, Swecker & Mathis

[57] ABSTRACT

A vehicle window includes a glass ply with a layer of thermoset polyurethane over the outer face of the glass which inhibits Restrahlen Band reflection at 8-12 microns from the glass. The polyurethane layer may include an inner layer portion of relatively hard polyurethane and an outer layer of relatively soft polyurethane.

21 Claims, 3 Drawing Sheets

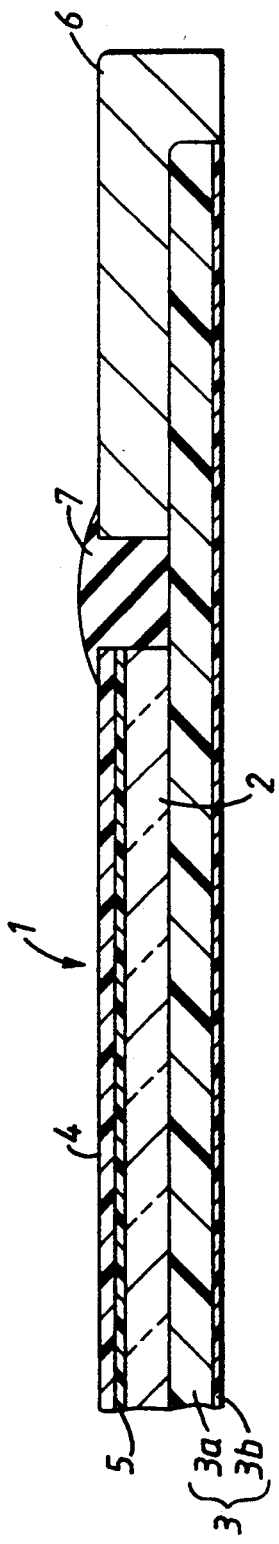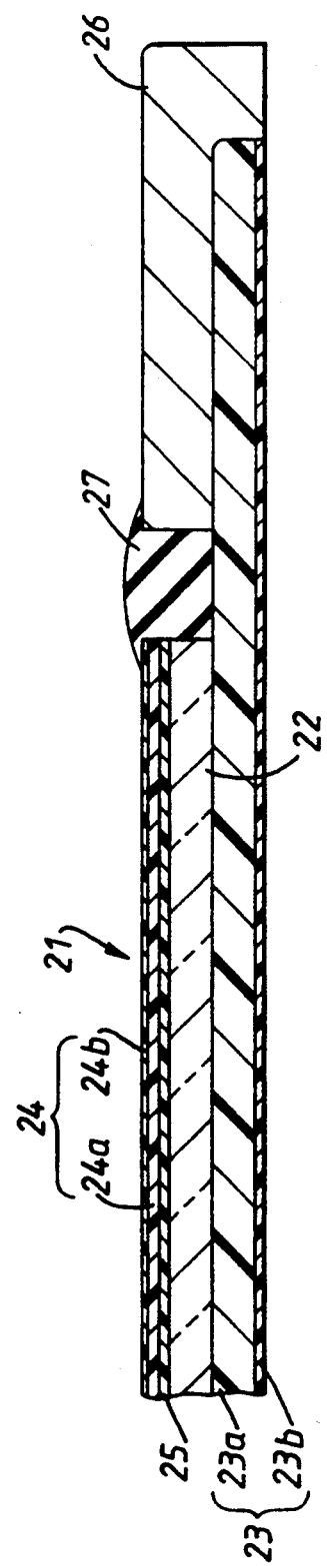

CONVEYANCE WINDOW WITH SUPPRESSED REFLECTIONS

BACKGROUND TO THE INVENTION

The invention relates to windows for conveyances of all kinds including aircraft, ships and land vehicles, and is especially applicable to windows for use in conveyances having military application.

Although many sophisticated plastics are now available, glass still possesses important advantages for use in windows, at least as a component or ply of a laminated window. Apart from its durability, it is more rigid than most available plastics and is not adversely affected by the application or use of an electrically conductive heating film on its surface. It is thus commonly used as the outer ply of even the most sophisticated windows.

A disadvantage of using glass as the outer ply, especially in military applications, is its pronounced reflections at two regions in the far infra red spectrum, namely 8–12 microns and 18–25 microns. This is a known phenomenon and the reflection peaks are known as "Restrahlen Bands". These reflections, especially the reflection of incident radiation from the glass at a wavelength of 8–12 microns, enable a vehicle equipped with a window with a glass outer ply to be detected by infra red instruments and indeed, when the window is fitted to a helicopter, results in a highly characteristic intermittent infra red reflection which can be detected and readily recognized by opposing military forces. It would therefore be desirable, for military application, to suppress the reflectivity of glass outer plies in the far infra red region of the spectrum.

In the past, efforts have been made to suppress infra red reflections of glass in order to increase the emissivity of glass surfaces on solar cells by using a multilayer thin film tailored to reduce such reflections. However, such efforts have resulted in only modest reductions in the Restrahlen Band reflections as illustrated in the graph forming FIG. 5 of the accompanying drawings and discussed later in this specification.

Moreover, besides the modest improvement achieved, this obvious approach to the problem has a number of serious disadvantages:

(a) because the films are necessarily thin (typically of the order of 50 to 500 nm), but the thickness of the layers is critical, their performance, at least in airborne applications, inevitably deteriorates as a result of abrasion.

(b) abrasion is also liable to result in a deterioration of optical performance of the coating, in particular the onset of haze and consequent reduction in resolution.

(c) it would be technically difficult, and consequently expensive, to deposit the required complex multilayer films with the required degree of precision over large pieces of curved glass.

The present invention aims to overcome, or at least alleviate, the above disadvantages and is based on a completely different approach to the problem.

SUMMARY OF THE INVENTION

The present inventors have realized that the Restrahlen Band reflections can be suppressed by bonding a layer onto the outer glass surface which layer has a low reflection and high absorption at these wavelength bands, and found that certain polyurethane layers have these properties as well as the desirable near infra red transmittance, good optical quality and, surprisingly, high durability including abrasion resistance.

According to the present invention, a thermoset polyurethane layer on the outer face of an outer glass ply of a window for a conveyance is used to inhibit the Restrahlen Band reflections of incident radiation at a wavelength of 8–12 microns from the glass.

The invention also provides a window in or for a conveyance comprising an outer glass ply with a layer of thermoset polyurethane over the outer face of the glass.

The thermoset polyurethane layer may comprise a single layer or a plurality of superposed layer portions, typically two layer portions.

The thermoset polyurethane layer may be bonded to the outer face of the glass by a thermoplastic bonding layer.

A thermoset polyurethane is used because such polyurethanes provide the required abrasion resistance and are self-healing. The hardness of the polyurethane, and time taken to self-heal, will depend on the degree of cross-linking and both will generally increase with a reduction in the molecular weight between branch points of the polymer. When two superposed layer portions are employed, the inner layer can be relatively hard so as to provide good impact protection of the underlying thermoplastic bonding layer and the outer layer can be relatively soft so as to provide good self-healing properties. The polymers used in the practice of the present invention will usually have a molecular weight between branch points in the range 500 to 2500. The invention may employ harder and/or softer polymers depending upon the properties required of the window. The preferred harder polymers which may be employed as a single layer or as an inner layer portion have a molecular weight between branch points in the range 500 to 1500, especially 600 to 900 and the preferred softer polymers which may be employed as a single layer or as an outer layer portion have a molecular weight between branch points in the range 1200 to 2500, especially 1200 to 1800. Polymers having a Shore hardness (Type A durometer) of at least 70, and a Shore hardness (Type D durometer) up to 90, are generally preferred. The preferred harder polymers can have a Shore hardness (Type D durometer) in the range of 78 to 90 and the preferred softer polymers can have a Shore hardness (Type A durometer) in the range of 70 to 90. The harder polymers give better optical properties than softer polymers, while suffering, however, from an increases self-healing time at ambient temperatures, such as in the United Kingdom.

Particularly preferred thermoset polyurethanes for use in the practice of the present invention are prepared from a cycloaliphatic diisocyanate, a polycaprolactone diol and a polycaptrolactone triol. The cycloaliphatic diisocyanate is preferably 4,4' methylene-bis-(cyclohexylisocyanate), commercially available under the trade mark DESMODURW. The polycaprolactone diol preferably has an average molecular weight in the range about 500 to about 700 to produce a polyurethane with the required resilience. The polycaprolactone triol preferably has a molecular weight in the range about 250 to 400 in order to provide the desired cross-link density.

The thermoset polymers may be produced by "one-shot" reaction systems, although it is preferred to produce an isocyanate rich prepolymer by reacting a diisocyanate with half the total amount of diol, and then react that prepolymer with the triol and the remaining diol. This route is preferred, as it takes advantage of the greater miscibility of the diol (than the triol) with the isocyanate, and reduces the risk of optical aberrations in the finished product.

The thermoset polyurethane preferably has a low heat distortion temperature, measured in accordance with ASTM 648, of less than 60° C., and preferably less than 50° C. Such thermosets with a low heat distortion temperature, when laminated to glass, will not give rise to significant bending stresses, resulting from differential thermal expansion of the laminate, until well below normal UK ambient temperature (about 23° C.).

At around such ambient temperatures, the preferred harder thermoset polyurethanes exhibit similar surface hardness to those of conventional rigid plastics, such as polycarbonates and acrylics. In addition, they have a greater resistance to scratching. Moreover, if they are scratched, the damage will, provided they have not been cut, self-heal after several days at normal UK ambient temperatures, and such healing can, if necessary, be accelerated by heating to 35° C. to 40° C. when the recovery time will be substantially reduced, in some cases to seconds. The preferred softer thermoset polyurethanes have faster self-healing than the harder thermoset polyurethanes, and typically the softer polyurethanes can self-heal in less than a few minutes, even in a few seconds, at normal UK ambient temperatures.

The thermoset polyurethane layer may be bonded to the outer glass face by a thermoplastic polymer interlayer, preferably of polyurethane. Such an interlayer may have a thickness in the range from 0.125 to 1.5 mm, preferably 0.25 to 0.76 mm.

The thermoset polyurethane layer will normally have a thickness of at least 0.5 mm to provide resistance to deformation of a underlying thermoplastic bonding layer (such as the thermoplastic layer referred to above) resulting from impact of airborne particles on the thermoset polyurethane layer. When a preferred harder thermoset polyurethane layer is employed, the layer preferably has a thickness in the range 0.75 to 1.25 mm.

When the preferred softer polyurethane layer is employed in a single layer, the thickness is preferably from 1.25 to 2 mm in order to minimize damage through the thermoset layer into the thermoplastic layer below. When an outer softer layer portion and an inner harder layer portion are employed as the thermoset polyurethane layer, the outer softer layer preferably has a thickness of from 0.15 to 0.4 mm, more preferably 0.25 mm, and the inner harder layer preferably has a thickness of from 0.5 to 1.25 mm, more preferably 1 mm. Layer thicknesses of the polyurethane layer of greater than 2 mm lead to poorer optics and higher costs with no significant compensating advantages.

While the thermoset polymers have inherently good resistance to oxidation and UV degradation for external liners, it may be prudent to include protective additives such as octadecyl 3,5-di-tert-butyl-4-hydroxyhydrocinnamate, commercially available as IRGANOX 1076 from Ciba-Geigy and 2(2'-hydroxy-3', 5'-di-tert-amyl phenyl) benzotriazole, commercially available as TINUVIN 328 from Ciba-Geigy at approximate concentrations of 0.5% by weight based on the overall weight of the thermoset polyurethane material.

As explained above, the invention provides for the suppression of Restrahlen Band reflections from windows, especially windows for military conveyances. The term "conveyance" is used in this specification and claims in a general sense to include not only land vehicles, but also ships and aircraft, especially helicopters. In practice, with currently available equipment, the detection of Restrahlen Band reflections can take place over only a limited range, so that the present invention is more applicable to slower moving conveyances than most fixed wing aircraft, especially conveyances with a maximum speed below 300 knots. The present invention is especially applicable to windows of helicopter and ground vehicles, for example trucks, tractor units, troop carriers and tanks.

BRIEF DESCRIPTION OF THE DRAWINGS

Embodiments of the present invention will now be described by way of example only, with reference to the accompanying drawings, in which:

FIG. 1 is a cross-section through one edge of a bilayer windscreen, suitable for a helicopter or ground vehicle, the bilayer windscreen carrying a thermoset polyurethane layer on the outer glass face in accordance with a first embodiment of the invention;

FIG. 2 is a cross-section through one edge of a bilayer windscreen, suitable for a helicopter or ground vehicle, the bilayer windscreen carrying a thermoset polyurethane layer on the outer glass face in accordance with another embodiment of the invention;

DETAILED DESCRIPTION OF THE PREFERRED EMBODIMENTS

Figure 3:
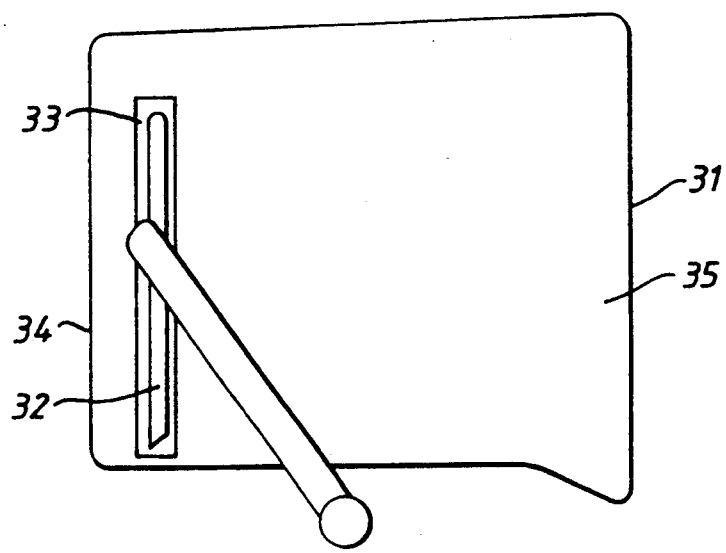
FIG. 3 is a side view of a windscreen in accordance with a further embodiment of the invention.

The application of the present invention to a so-called bilayer window, comprising an outer glass ply and an inner plastic ply, suitable for use in a helicopter or ground vehicle, will now be described, by way of example only, with reference to FIGS. 1 to 3 of the accompanying drawings. However, it will be appreciated that the application of a layer of thermoset polyurethane to suppress Restrahlen Band reflections in accordance with the invention is not limited to such "bilayer" windows, but extends generally to conveyance windows with an outer glass ply.

The expression "outer glass ply" is used in the present specification and claims to refer to a glass ply which, but for the use of a thermoset polyurethane layer to suppress Restrahlen Band reflections in accordance with the invention, would form the outer ply (and, indeed, possibly the only ply) of a window for a conveyance. The use of the term "outer" is not to be taken as implying that the window necessarily comprises any other (inner) glass ply.

Referring to FIG. 1, a windscreen for a helicopter made in accordance with a first embodiment of the present invention, is generally designated by the numeral 1. The windscreen 1 comprises an outer float glass ply 2 and a composite inner plastic ply 3. The plastic ply 3 comprises, in the particular case illustrated, an energy absorbing plastics interlayer 3a of, for example, thermoplastic polyurethane or polyvinyl butyral, and an inner layer of rigid thermoset polyurethane 3b. In a preferred design for a helicopter, the outer glass ply 2 is chemically toughened glass having a thickness in the range 2 to 4 mm, for example 3 mm, the interlayer 3a is a thermoplastic polyurethane having a thickness in the range 1.5 to 4 mm, for example, 2.5 mm, and the thermoset polyurethane inner layer 3b has a thickness in the range 0.5 to 2.5 mm, for example 1 mm. This thermoset polyurethane interlayer is preferably composed of the hard, highly cross-linked polyurethane recommended earlier in this specification for use on the outer glass layer and having a molecular weight between branch points in the range 500 to 1000.

The outer glass ply 2 carries, on its outer surface, a thermoset polyurethane layer 4 having a thickness in the range 0.5 to 2 mm, for example about 1.25 mm for a harder thermoset polyurethane or about 1.25 mm for a softer thermoset polyurethane. The layer 4 is bonded to the glass by a thermoplastic polyurethane interlayer 5 having a thickness in the range 0.125 to 1.5 mm, more preferably, 0.25 to 0.76 mm, the most preferred thickness being about 0.76 mm. The windscreen additionally comprises a composite edge attachment 6 for glazing the windscreen and a nib seal 7 for protecting the edge of the laminate from ingress of water. Such a windscreen, comprising a bilayer construction carrying a thermoset polyurethane layer may be referred to as a "trilayer" windscreen.

Referring to FIG. 2, in accordance with another embodiment of the present invention, there is shown a windscreen for a helicopter generally designated 21. The windscreen 21 comprises an outer float glass ply 22 and a composite inner plastics ply 23, comprising interlayers 23a and 23b, the ply 23 having the same structure as that of the embodiment of FIG. 1. The outer glass ply carries, on its outer surface, a thermoset polyurethane layer 24 having an inner layer portion 24a of a relatively hard thermoset polyurethane and an outer layer portion 24b of a relatively soft thermoset polyurethane. The relatively soft thermoset polyurethane has a molecular weight between branch points in the preferred range 1200 to 1800, typically around 1400. The use of the combination of an outer soft thermoset polyurethane layer applied to a hard thermoset polyurethane layer as employed in the embodiment of FIG. 1 provides improved self-healing properties of the composite thermoset polyurethane layer. The relatively soft polyurethane layer recovers more quickly than the relatively hard polyurethane layer. This provides improved self-healing over the use of a single hard polyurethane layer because although the hard layer is self-healing, it may take a long time for scratches to heal and optical performance to recover. The inner polyurethane layer 24a is typically 1 mm thick and the outer polyurethane layer portion is typically 0.25 mm thick. The thermoset polyurethane layer 24 is bonded to the glass by a thermoplastic polyurethane interlayer 25 which is the same as that employed in the embodiment of FIG. 1. The windscreen additionally comprises a composite edge attachment 26 and a nib seal 27 similar to those employed in the embodiment of FIG. 1.

When a softer polyurethane layer is used either as the single thermoset polyurethane layer 4 in the embodiment of FIG. 1 or as the outer polyurethane layer portion 24b in the embodiment of FIG. 2, it has been found by the present inventors that there is a potential problem with windscreen wiper blades sticking, in their parked positions, to the softer polyurethane layer. In order to overcome this problem, as shown in FIG. 3, a helicopter windscreen 31 incorporating a wiper blade 32 was provided with a region 33 on its outer surface 34 which defines a parking zone for the wiper blade 32. The remainder of the windscreen 31 is coated with a softer polyurethane thermoset layer 35 in accordance with the present invention. The parking zone 33 is defined either by providing a locally hardened area of the soft polyurethane thermoset layer in the vicinity of the wiper parking position or by replacing the thermoset polyurethane layer in the relevant areas 33 of the windscreen 31 with an epoxy resin layer of the same thickness as the polyurethane layer. In the latter case, the epoxy resin layer may be reinforced, for example, with reinforcing fibers.

EXAMPLE 1

A thermoset polyurethane ply suitable for use as the outer layer 4 (and also as the inner layer 3b) of the windscreen shown in FIG. 1 was prepared by the following procedure.

Three equivalents 4'4'methylene-bis (cyclohexylisocyanate)—available in commerce under the trade mark DESMODUR W—were mixed with one equivalent of a polycaprolactone diol having an average molecular weight of about 550 (commercially available as CAPA 200) and 0.002% by weight, based on the weight of isocyanate plus diol, of dibutyltin dilaurate. The mixture was heated at 80° C. for two hours. The isocyanate rich product was then mixed with 2 equivalents of polycaprolactone triol having an average molecular weight of about 300 (commercially available as TONE 0301) in a dispenser equipped with synchronized piston pumps and rotary mixer.

The reaction mixture from the dispenser was cast between parallel glass plattens spaced apart 1.25 mm (1 mm for inner layer 3b) in a known manner and cured to form a solid rigid thermoset pane having the following properties:

Shore hardness (Type D durometer) at 23° C.: 79
Heat distortion temperature at 118 kg (264 lbs) loading (ASTM 64S ): 38° C.
Taber abrasion. Change in haze after 100 cycles (ATSM D1044)
at 23° C.: <3%
at 50° C.: <1%
Sheen scratch test. Time to recover with 1000 g loading on stylus (British Standard 3900E2)
at 23° C.: 48 hours
at 50° C.: <60 seconds The material had an average molecular weight between branch points of 874.

The resulting thermoset polyurethane pane was bonded to the outer face of a 3 mm float glass pane using a thermoplastic polyurethane interlayer 0.5 mm thick by heating under pressure in a known manner to simulate the outer face of a windshield as described with reference to FIG. 1 of the drawings.

Figure 4:
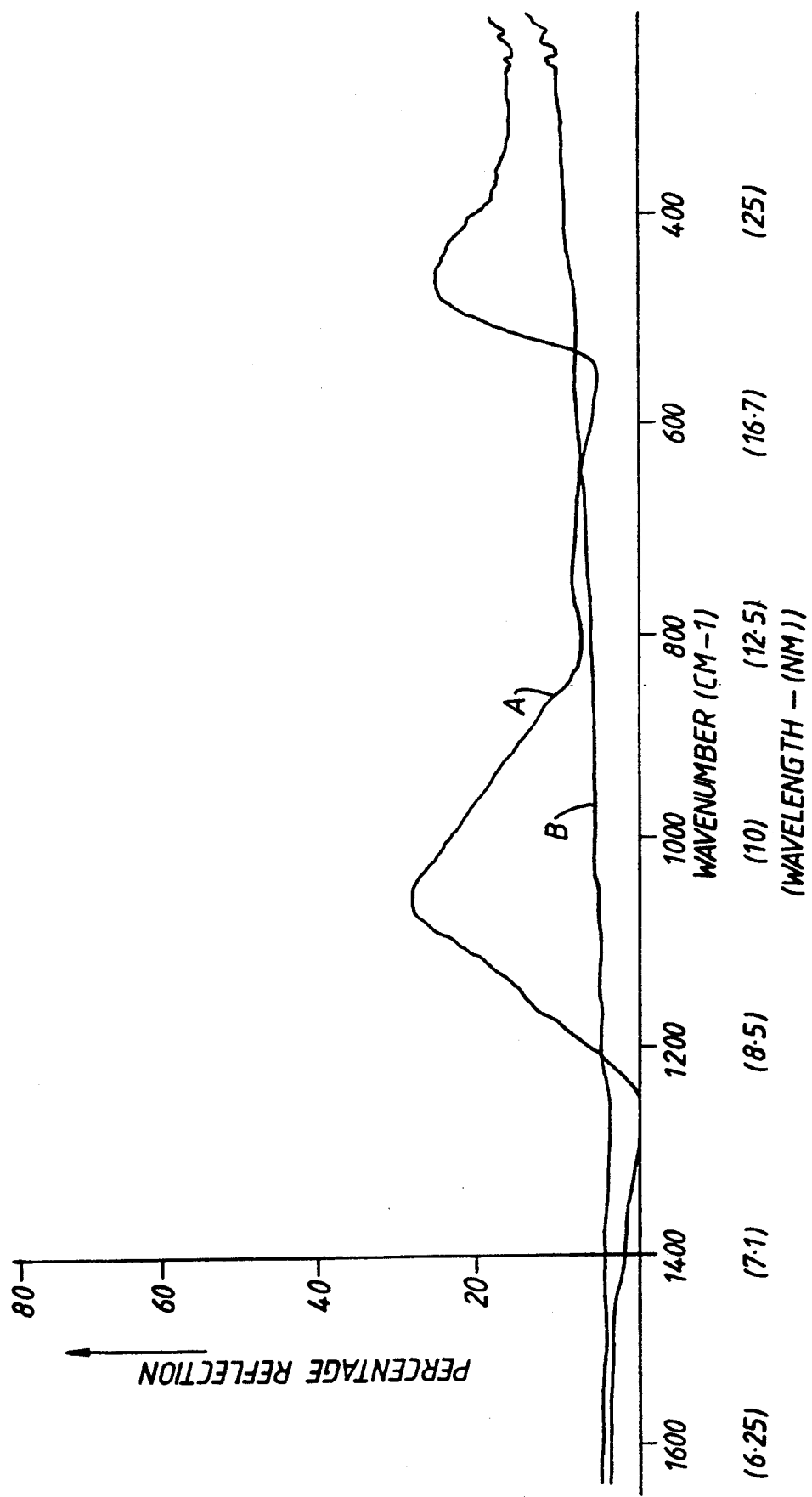
FIG. 4 is a graph showing the variation of reflection with wavelength, for wave numbers from 1400 to 2000 $cm^{-1}$, of a float glass surface (trace A) and of a float glass surface carrying an outer layer of thermoset polyurethane (trace B)

The infra red reflection spectrum of the thus simulated outer face, with the thermoset polyurethane layer towards the radiation source, was then measured over the range 1400 to 500 cm$^{-1}$ (7 to 50 microns) using a Perkin Elmer 577 infra-red spectrophotometer, and the results plotted as Trace B in the graph which accompanies this specification as FIG. 4. The corresponding spectrum for an exposed glass surface of a 3 mm float glass plane was similarly measured, and the results plotted on the same graph (Trace A). It will readily be seen that the distinctive Restrahlen Band reflections, observed with the exposed glass surface at 1250 to 850 cm$^{-1}$ (8 to 12 microns) and 550 to 400 cm$^{-1}$ (18 to 25 microns), are suppressed by the polyurethane.

The thermoset polyurethane has a high transmission in the visible region of the spectrum and in the near infra-red region from 700 to 1000 nm being effectively non-absorbing in these regions and having a refractive index close to that of the glass, so that the effect of bonding the thermoset polyurethane to the outer face of the glass on the transmission of the window in the above regions will generally be negligible (of the order of 1% or less).

EXAMPLE 2

In this Example, the polyurethane thermoset ply suitable for use as the outer layer 4 of the windscreen shown in FIG. 1 was prepared in a similar manner to that disclosed in Example 1. However, in order for the outer layer 4 to have a faster recovery time from scratches, the cross-link density of the thermoset polyurethane was reduced to a degree such that the molecular weight between branch points was about 1400. In this example, in the manner similar to that described with reference to Example 1, 0.933 equivalents of DESMODUR W were reacted with 0.5 equivalents of CAPA 200 and 0.433 equivalents of TONE 0301.

The reaction mixture was cast between parallel spaced glass plattens 1.25 mm apart in a similar manner to that of Example 1 and cured to form a solid rigid thermoset pane having the following properties:

Shore hardness (Type A durometer) at 23° C.: 90
Heat distortion temperature at 118 kg (264 lbs) loading (ASTM 648): 10° C.
Taber abrasion. Change in haze over 100 cycles (ASTM D1044) at 23° C.: <1% haze
Sheen scratch test. Time to recover with 1000 g loading on stylus (B.S. 3900E2) at 23° C.: <5 seconds With the softer thermoset polyurethane material, a greater thickness of material than the harder thermoset polyurethane is required to minimize damage to the thermoplastic layer below. This greater thickness may be, for example, 1.25 to 2 mm.

EXAMPLE 3

In order to gain the benefit of the impact protection given by the harder formulation to the thermoplastic layer and the fast scratch recovery time of the softer thermoset polyurethane layer, a composite thermoset polyurethane layer was formed in a manner similar to that disclosed with reference to Examples 1 and 2. A pane of the harder thermoset polyurethane material disclosed in Example 1 and having a thickness of 1 mm was coated with a 0.25 mm layer of the softer thermoset polyurethane material disclosed in Example 2.

Figure 5:
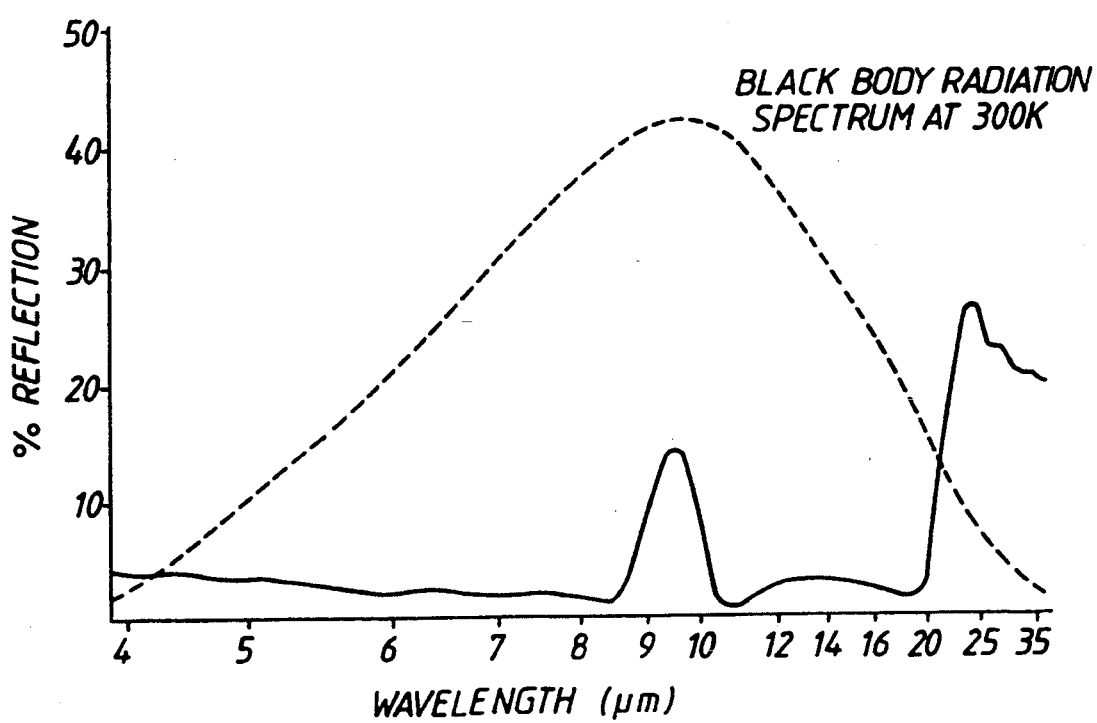
FIG. 5 is a graph showing, by way of comparison, the variation of reflection with wavelength from 4 to 35 microns for a glass solar cell cover having a multi-layered thin film tailored to suppress reflections in that range.

In order to illustrate the effectiveness of the various embodiments of the present invention to inhibit Restrahlen Band reflection, the effect of a multi-layer thin film in suppressing infra red reflections on glass for use as a solar cell cover slip over the range 4 to 35 microns is illustrated, by way of comparison, in FIG. 5 of the drawings. It will be seen that the reflections of incident radiation from the glass at wavelengths of 8 to 12 microns and 18 to 25 microns are still very prominent and not well disguised. Thus, the present invention has great advantages in effectiveness over the obvious approach of using a multi-layer thin film to suppress the characteristic infra red reflections of glass.

In addition, the layers of thermoset polyurethane bonded to the outer surface of the glass have been tested for wiper blade resistance, rain erosion, sand erosion, accelerated weathering, thermal cycling and humidity. In many cases the results obtained, indicating that the structure can be expected to be durable in service, were superior to the results obtained with a known bilayer windscreen having an uncoated outer glass face. Another advantage of the use of an outer layer of thermoset polyurethane on the outer surface of the windscreen when compared to the known bilayer windscreen is that the windscreen has improved rain-shedding properties because when rain falls on the windscreen it has a greater tendency to run off the outer surface of the windscreen as a result of the reduced contact angle between water and the polyurethane material.

Although not illustrated in the drawings, windows in accordance with present inventions may have a conductive heating film, for example gold or more preferably, a transparent semiconductor metal oxide such as indium tin oxide, on the outer glass for demisting and de-icing purposes. Such films are generally deposited on the outer glass ply and will usually be on the inner facing surface of that ply. Such films may also be used to heat the outer polyurethane layer sufficiently above ambient temperature to promote rapid heating of even highly cross linked (molecular weight between branch points in the range 500 to 1500) thermoset polyurethane layers.

What is claimed is:

1. A window, in a conveyance, comprising an outer glass ply and a layer of thermoset polyurethane over the face of the glass toward the outside of the conveyance whereby the reflection of radiation at a wavelength of 8 to 12 microns incident on the outer face of the window is suppressed, wherein said layer of thermoset polyurethane has a thickness of at least 0.5 mm but not greater than 2 mm and a Shore hardness (Type A duromater) of at least 78.

2. A window according to claim 1 wherein said thermoset polyurethane has a molecular weight between branch points in the range 500 to 2500.

3. A window according to claim 1 wherein the thermoset polyurethane layer is a single layer.

4. A window according to claim 1 wherein the thermoset polyurethane layer comprises a plurality of superposed layer portions.

5. A window according to claim 3, wherein the single layer is of a thermoset polyurethane which has a molecular weight between branch points in the range 500 to 1500.

6. A window according to claim 3, wherein the single layer is of a thermoset polyurethane which has a molecular weight between branch points in the range 500 to 1500.

7. A window according to claim 3, wherein the single layer is of a thermoset polyurethane which has a molecular weight between branch points in the range 1200 to 2500.

8. A window according to claim 3, wherein the single layer is of a thermoset polyurethane which has a molecular weight between branch points in the range 1200 to 2500.

9. A window according to claim 1 in which said thermoset polyurethane is derived from a cycloaliphatic diisocyanate, a polycaprolactone diol and a polycaprolactone triol.

10. A window according to claim 1 wherein said thermoset polyurethane layer is bonded to the outer glass by a thermoplastic polymer interlayer.

11. A window according to claim 10 wherein said thermoplastic polymer interlayer is of thermoplastic polyurethane.

12. A window according to claim 1 comprising an outer glass ply and an inner plastics ply.

13. A window according to claim 12 wherein the inner plastics ply is a composite ply comprising an energy absorbing plastics interlayer and an inner layer of thermoset polyurethane.

14. A window according to claim 13 wherein the energy absorbing plastics interlayer is of thermoplastic polyurethane.

15. A window in a helicopter or ground vehicle which is substantially symmetrical through its thickness, the window comprising an outer glass ply with thermoset polyurethane layers bonded to each of an inner and an outer face of the glass by thermoplastic interlayers, wherein said layer of thermoset polyurethane bonded to said outer face has a thickness of at least 0.5 mm but not greater than 2 mm and a Shore hardness (Type A duromater) of at least 78 and whereby the reflection of radiation at a wavelength of 8 to 12 microns incident on the outer face of the window is suppressed.

16. A window in a helicopter comprising an outer glass ply and a layer of thermoset polyurethane over the face of the glass toward the outside of the helicopter whereby the reflection of radiation at a wavelength of 8 to 12 microns incident on the outer face of the window is suppressed, wherein said layer of thermoset polyurethane has a thickness of at least 0.5 mm but not greater than 2 mm and a Shore hardness (Type A durometer) of at least 78.

17. A window in a ground vehicle comprising an outer glass ply and a layer of thermoset polyurethane over the face of the glass toward the outside of the ground vehicle whereby the reflection of radiation at a wavelength of 8 to 12 microns incident on the outer face of the window is suppressed, wherein said layer of thermoset polyurethane has a thickness of at least 0.5 mm but not greater than 2 mm and a Shore hardness (Type A durometer) of at least 78.

18. A window, in a conveyance, comprising an outer glass ply and a layer of thermoset polyurethane over the face of the glass toward the outside of the conveyance for suppressing the reflection of radiation at a wavelength of 8 to 12 microns incident on the outer face of the window, wherein the thermoset polyurethane layer comprises a plurality of superposed layer portions including an inner layer portion and an outer layer portion which is soft relative to the inner layer portion, wherein said thermoset polyurethane layer has a thickness of at least 0.5 mm but not greater than 2 mm and a Shore hardness (Type A durometer) of at least 78.

19. A window, in a conveyance, comprising an outer glass ply and a layer of thermoset polyurethane having a Shore hardness (Type A durometer) of at least 78 over the face of the glass toward the outside of the conveyance whereby the reflection of radiation at a wavelength of 8 to 12 microns incident on the outer face of the window is suppressed, wherein said layer of thermoset polyurethane has a thickness of at least 0.5 mm but not greater than 2 mm.

20. A window according to claim 19, wherein the thermoset polyurethane has a Shore hardness (Type D durometer) of not greater than 90.

21. A window, in a conveyance, comprising an outer glass ply and a layer of thermoset polyurethane over the face of the glass toward the outside of the conveyance whereby the reflection of radiation at a wavelength of 8 to 12 microns incident on the outer rice of the window is suppressed, wherein a parking zone for a windscreen wiper blade is defined on the outer surface of the window, said zone being harder than the surrounding thermoset polyurethane whereby sticking of a wiper blade in its parked position on the parking zone is alleviated, wherein said layer of thermoset polyurethane has a thickness of at least 0.5 mm but not greater than 2 mm and a Shore hardness (Type A durometer) of at least 78.

* * * * *